(12) United States Patent
Nakao et al.

(10) Patent No.: US 8,301,327 B2
(45) Date of Patent: Oct. 30, 2012

(54) VEHICLE ESTIMATE NAVIGATION APPARATUS, VEHICLE ESTIMATE NAVIGATION, AND VEHICLE ESTIMATE NAVIGATION PROGRAM

(75) Inventors: Yukio Nakao, Kobe (JP); Mitsuhiro Wada, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 165 days.

(21) Appl. No.: 12/872,082

(22) Filed: Aug. 31, 2010

(65) Prior Publication Data

US 2011/0125359 A1      May 26, 2011

(30) Foreign Application Priority Data

Nov. 20, 2009 (JP) ................................. 2009-265126

(51) Int. Cl.
*G01M 17/00* (2006.01)
(52) U.S. Cl. ......................................................... 701/29
(58) Field of Classification Search ........................ None
See application file for complete search history.

(56) References Cited

U.S. PATENT DOCUMENTS

| | | | |
|---|---|---|---|
| 5,525,998 A | 6/1996 | Geier | |
| 7,983,836 B2 * | 7/2011 | Breed | 701/117 |
| 2008/0165018 A1 * | 7/2008 | Breed | 340/573.1 |
| 2009/0030605 A1 * | 1/2009 | Breed | 701/208 |
| 2010/0145611 A1 * | 6/2010 | Tokue et al. | 701/208 |
| 2011/0098882 A1 * | 4/2011 | Sugisawa et al. | 701/35 |

FOREIGN PATENT DOCUMENTS

| | | |
|---|---|---|
| EP | 2 325 607 A1 | 5/2011 |
| JP | 2000-514195 A | 10/2000 |
| JP | 2009-198185 A | 9/2009 |
| WO | WO 98/27405 A1 | 6/1998 |
| WO | WO 98/36244 A2 | 8/1998 |

* cited by examiner

*Primary Examiner* — Thomas Tarcza
*Assistant Examiner* — Nagi Murshed
(74) *Attorney, Agent, or Firm* — Birch, Stewart, Kolasch & Birch, LLP

(57) ABSTRACT

A vehicle estimate navigation apparatus including: a speed vector calculation means for calculating, based on GPS information by a GPS receiver mounted in a running vehicle, a speed vector of a running speed of the vehicle; a tire rotation information detection means for detecting rotation information of tires attached to the vehicle; a tire rotation speed calculation means for calculating rotation speeds of the tires based on tire rotation information obtained by the tire rotation information detection means; a speed calculation means for calculating a vehicle speed based on the speed vector information; a yaw rate calculation means for calculating a vehicle yaw rate based on the speed vector information; a first parameter calculation means for calculating a first parameter of a first relational expression between the vehicle speed calculated by the speed calculation means and the tire rotation speed, the vehicle speed being obtained based on a formula model for calculating a tire ground speed based on the tire rotation speeds obtained by the tire rotation speed calculation means; and a second parameter calculation means for calculating a second parameter of a second relational expression between the yaw rate calculated by the yaw rate calculation means and the tire rotation rate, the yaw rate being obtained based on a formula model for calculating a tire ground speed based on the tire rotation speeds obtained by the tire rotation speed calculation means.

17 Claims, 14 Drawing Sheets

VEHICLE ESTIMATE NAVIGATION APPARATUS, VEHICLE ESTIMATE NAVIGATION, AND VEHICLE ESTIMATE NAVIGATION PROGRAM

TECHNICAL FIELD

The present invention relates to a vehicle estimate navigation apparatus, vehicle estimate navigation, and a vehicle estimate navigation program.

BACKGROUND ART

A ground-based navigation system, which guides the running of a vehicle, navigates the vehicle using signals from a GPS satellite. When the signals from the GPS satellite are blocked or reflected by a high-rise building to prevent a sufficient receipt of the signals, an accurate guide of the running is impossible.

To prevent this, it has been conventionally carried out to use, when signals from a GPS satellite cannot be received sufficiently, some kind of methods to perform an estimate navigation, thereby preventing the navigation from being interrupted. However, many of these methods use sensor information obtained from a yaw rate sensor or an acceleration sensor. Thus, an increased cost has been caused.

To solve this, an estimate navigation not using an additional sensor has been suggested (e.g., see Patent Literature 1). The method disclosed in Patent Literature 1 calculates the accurate dynamic loaded radii of the respective tires attached to the vehicle to perform geometrically an estimate navigation based on the calculated values of the dynamic loaded radii.

Citation List

Patent Literature

Patent Literature 1: Published Japanese translation of a PCT application No. 2000-514195

SUMMARY OF INVENTION

Technical Problem

However, when the vehicle is turning, a lateral G causes a difference in load between inner and outer wheels in such a manner that the inner and outer wheels have dynamic loaded radii among which those of the inner wheels increase and those of the outer wheels decrease when compared to those in the straight running. Thus, the turning radius calculated based on the difference in the number of rotations between the inner and outer wheels does not coincide with an actual turning radius value. Furthermore, the tire dynamic loaded radius does not stay at a fixed value because of a change of an internal pressure due to an increased temperature or an influence by the vehicle speed.

Specifically, in order to perform accurate estimate navigation, it is required to establish an appropriate tire model that considers a load difference between the inner and outer wheels due to the turning to estimate the tire ground speed based on the wheel speed information. However, such a suggestion has not been made up to now.

The present invention has been made in view of the situation as described above. It is an objective of the present invention to provide a vehicle estimate navigation apparatus, vehicle estimate navigation, and a vehicle estimate navigation program by which the vehicle tire rotation speed information is used to calculate a yaw rate and a speed and accurate estimate navigation can be performed without using an additional sensor.

Solution to Problem

In accordance with the present invention, there is provided a vehicle estimate navigation apparatus including:

a speed vector calculation means for calculating, based on GPS information by a GPS receiver mounted in a running vehicle, a speed vector of a running speed of the vehicle;

a tire rotation information detection means for detecting rotation information of tires attached to the vehicle;

a tire rotation speed calculation means for calculating rotation speeds of the tires based on tire rotation information obtained by the tire rotation information detection means;

a speed calculation means for calculating a vehicle speed based on the speed vector information;

a yaw rate calculation means for calculating a vehicle yaw rate based on the speed vector information;

a first parameter calculation means for calculating a first parameter of a first relational expression between the vehicle speed calculated by the speed calculation means and the tire rotation speed, the vehicle speed being obtained based on a formula model for calculating a tire ground speed based on the tire rotation speeds obtained by the tire rotation speed calculation means; and a second parameter calculation means for calculating a second parameter of a second relational expression between the yaw rate calculated by the yaw rate calculation means and the tire rotation rate, the yaw rate being obtained based on a formula model for calculating a tire ground speed based on the tire rotation speeds obtained by the tire rotation speed calculation means.

In the vehicle estimate navigation apparatus of the present invention, a parameter of a formula model for calculating a tire ground speed based on the tire rotation speed is estimated at the GPS reception. When the GPS reception is impossible, this parameter can be used to calculate a vehicle speed and a yaw rate, thus realizing accurate estimate navigation.

The first parameter calculation means and the second parameter calculation means can be respectively configured so as to always calculate the first parameter and the second parameter when GPS information is received and to use, when the GPS information cannot be received, the latest calculated parameter to calculate the vehicle speed and the yaw rate based on the tire rotation speed.

The calculation of the first parameter and the second parameter when the GPS information is received can be configured to be carried out whenever every predetermined time is reached.

The calculation of the first parameter and the second parameter when the GPS information is received can be configured to be carried out whenever the pulse number from the tire rotation information detection means reaches a predetermined value. When the first parameter and the second parameter are calculated at a predetermined time, the smaller the pulse number at each predetermined time is, the larger error the tire rotation speed has. However the above calculation can allow the tire rotation speed error to be constant regardless of the speed, thus improving the estimate accuracy during a low-speed running.

The calculation of the first parameter and the second parameter when the GPS information is received can be configured to be carried out for each one rotation of the tires.

It is possible to configure, when the reception of GPS information is impossible, the calculation of the vehicle speed and the yaw rate using the latest parameter based on the tire rotation speed to be performed for each one rotation of the tires.

When assuming that the vehicle speed obtained by the speed calculation means is V and the sum of the rotation angular velocities of the inner and outer wheels is x, the first relational expression can be V=A1×x+B1 in which A1 and B1 are the first parameters; and when assuming that the yaw rate obtained by the yaw rate calculation means is Y, the square of the sum of the rotation angular velocities of the inner and outer wheels is z, and a difference between the rotation angular velocities of the inner and outer wheels is y, the second relational expression can be Y=A2×y/(B2×z+C2) in which A2, B2, and C2 are the second parameters.

The rotation speed can be a rotation speed of a following wheel tire. In this case, the calculation of the tire rotation speed is not influenced by a slip ratio. Thus, the rotation speed can be calculated more accurately.

In accordance with the present invention, there is also provided a vehicle estimate navigation including:

a speed vector calculation step of calculating, based on GPS information by a GPS receiver mounted in a running vehicle, a speed vector of a running speed of the vehicle;

a tire rotation speed calculation step of calculating rotation speeds of the tires based on tire rotation information obtained by the tire rotation information detection means for detecting rotation information of tires attached to the vehicle;

a speed calculation step of calculating a vehicle speed based on the speed vector information;

a yaw rate calculation step of calculating a vehicle yaw rate based on the speed vector information;

a first parameter calculation step of calculating a first parameter of a first relational expression between the vehicle speed calculated in the speed calculation step and the tire rotation speed, the vehicle speed being obtained based on a formula model for calculating a tire ground speed based on the tire rotation rates obtained in the tire rotation speed calculation step; and a second parameter calculation step of calculating a second parameter of a second relational expression between the yaw rate calculated in the yaw rate calculation step and the tire rotation speed, the yaw rate being obtained based on a formula model for calculating a tire ground speed based on the tire rotation speeds obtained in the tire rotation speed calculation step.

In the vehicle estimate navigation of the present invention, a parameter of a formula model for calculating a tire ground speed based on the tire rotation speed is estimated at the GPS reception. When the GPS reception is impossible, this parameter can be used to calculate a vehicle speed and a yaw rate, thus realizing accurate estimate navigation.

The first parameter calculation step and the second parameter calculation step can be respectively configured so as to always calculate the first parameter and the second parameter when GPS information is received and to use, when the GPS information cannot be received, the latest calculated parameter to calculate the vehicle speed and the yaw rate based on the tire rotation speed.

The calculation of the first parameter and the second parameter when the GPS information is received can be configured to be carried out whenever every predetermined time is reached.

The calculation of the first parameter and the second parameter when the GPS information is received can be configured to be carried out whenever the pulse number from the tire rotation information detection means reaches a predetermined value. When the first parameter and the second parameter are calculated at a predetermined time, the smaller the pulse number at each predetermined time is, the larger error the tire rotation speed has. However the above calculation can allow the tire rotation speed error to be constant regardless of the speed, thus improving the estimate accuracy during a low-speed running.

The calculation of the first parameter and the second parameter when the GPS information is received can be configured to be carried out for each one rotation of the tires.

It is possible to configure, when the reception of GPS information is impossible, the calculation of the vehicle speed and the yaw rate using the latest parameter based on the tire rotation speed to be performed for each one rotation of the tires.

When assuming that the vehicle speed obtained in the speed calculation step is V and the sum of the rotation angular velocities of the inner and outer wheels is x, the first relational expression can be V=A1×x+B1 in which A1 and B1 are the first parameters; and when assuming that the yaw rate obtained in the yaw rate calculation step is Y, the square of the sum of the rotation angular velocities of the inner and outer wheels is z, and a difference between the rotation angular velocities of the inner and outer wheels is y, the second relational expression can be Y=A2×y/(B2×z+C2) in which A2, B2, and C2 are the second parameters.

The rotation speed can be a rotation speed of a following wheel tire. In this case, the calculation of the tire rotation speed is not influenced by a slip ratio. Thus, the rotation speed can be calculated more accurately.

In accordance with the present invention, there is further provided a vehicle estimate navigation program causing, in order to carry out an estimate navigation, a computer to function as:

a speed vector calculation means for calculating, based on GPS information by a GPS receiver mounted in a running vehicle, a speed vector of a running speed of the vehicle, a tire rotation speed calculation means for calculating rotation speeds of tires based on tire rotation information obtained by the tire rotation information detection means for detecting rotation information of the tires attached to the vehicle;

a speed calculation means for calculating a vehicle speed based on the speed vector information;

a yaw rate calculation means for calculating a vehicle yaw rate based on the speed vector information;

a first parameter calculation means for calculating a first parameter of a first relational expression between the vehicle speed calculated by the speed calculation means and the tire rotation speed, the vehicle speed being obtained based on a formula model for calculating a tire ground speed based on the tire rotation speeds obtained by the tire rotation speed calculation means; and a second parameter calculation means for calculating a second parameter of a second relational expression between the yaw rate calculated by the yaw rate calculation means and the tire rotation rate, the yaw rate being obtained based on a formula model for calculating a tire ground speed based on the tire rotation rates obtained by the tire rotation speed calculation means.

Advantageous Effects of Invention

According to the vehicle estimate navigation apparatus, the vehicle estimate navigation, and the vehicle estimate navigation program of the present invention, accurate estimate navigation can be carried out without using an additional sensor.

DESCRIPTION OF EMBODIMENTS

The following section will describe in detail embodiments of the vehicle estimate navigation apparatus, the vehicle estimate navigation, and the vehicle estimate navigation program of the present invention with reference to the attached drawings.

Figure 1:
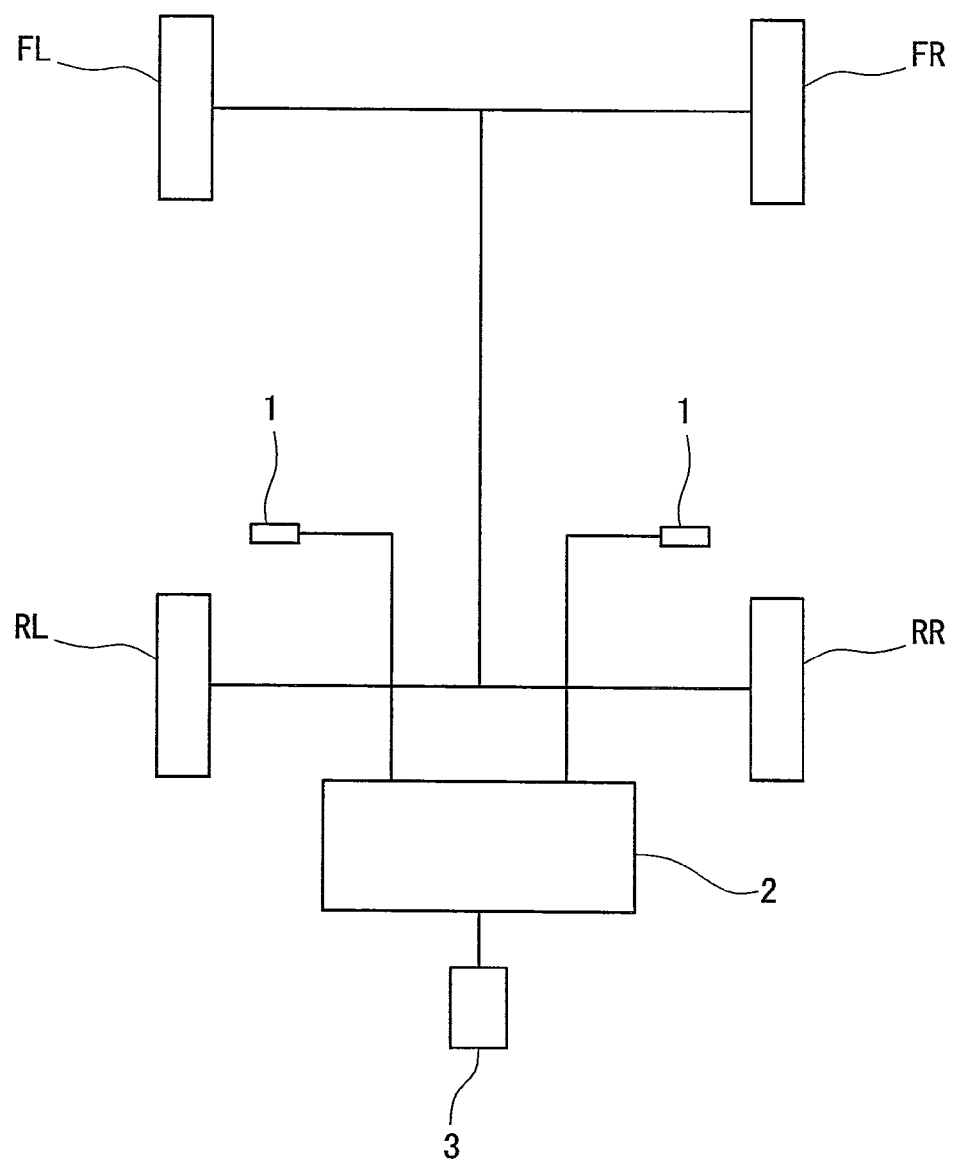
FIG. 1 is a block diagram illustrating one embodiment of the vehicle estimate navigation apparatus of the present invention.

As shown in FIG. 1, the vehicle estimate navigation apparatus according to one embodiment of the present invention includes a normal wheel speed detection means (wheel rotation information detection means) 1 in order to detect the wheel rotation information of a left rear wheel (RL) tire and a right rear wheel (RR) tire as following wheels among four tires included in a four-wheel vehicle (front-wheel drive vehicle) of a left front wheel (FL), a right front wheel (FR), the left rear wheel (RL), and the right rear wheel (RR). The wheel speed detection means 1 are provided so as to be associated with the tires.

The wheel speed detection means 1 can be, for example, a wheel speed sensor that uses an electromagnetic pickup or the like to generate a rotation pulse to measure, based on the number of pulses, a rotation angular velocity and a wheel speed. The output from the wheel speed detection means 1 is given to a control unit 2 that is a computer such as ABS. This control unit 2 is connected to a GPS apparatus 3 that can receive GPS information.

Figure 2:
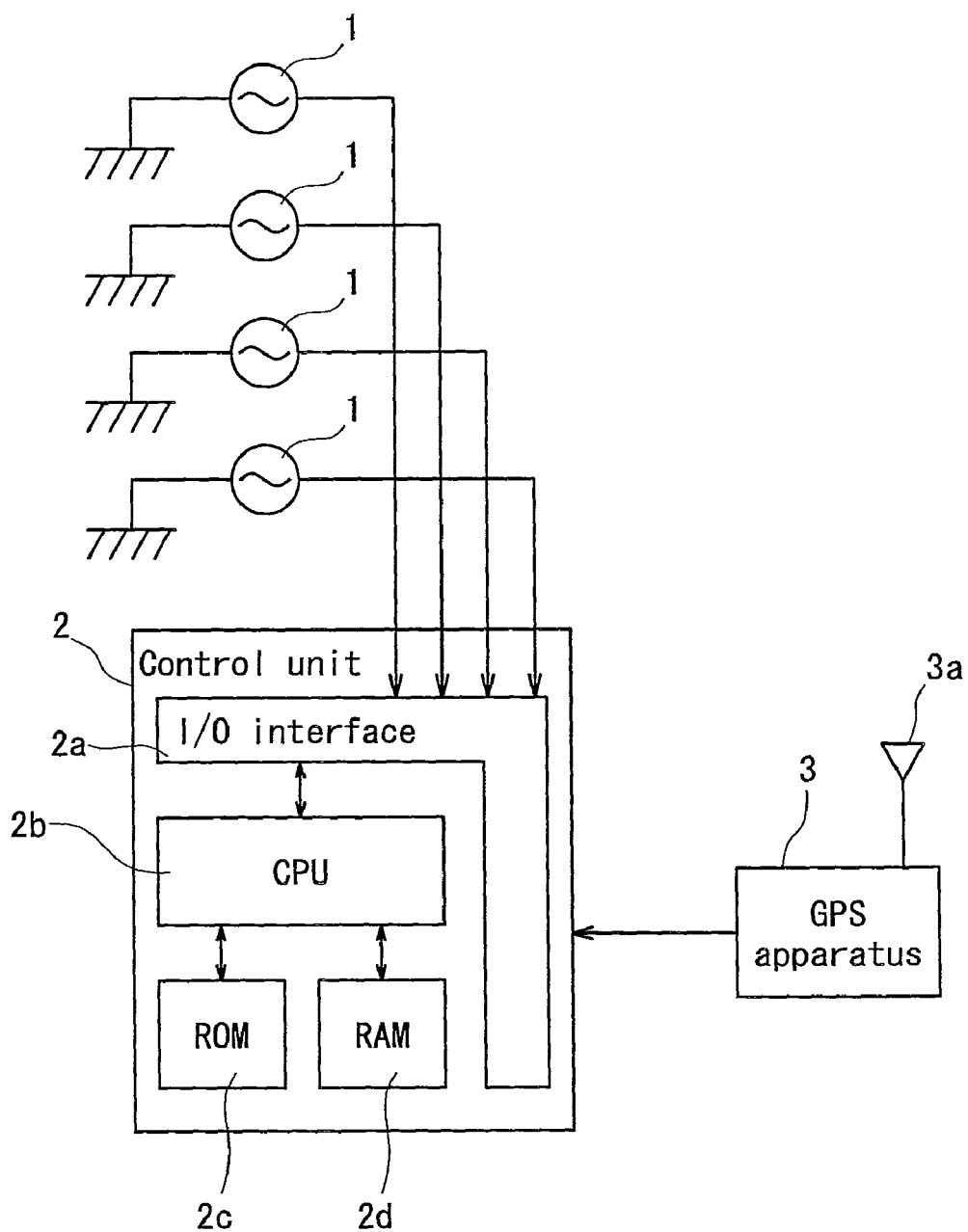
FIG. 2 is a block diagram illustrating the electric configuration of the vehicle estimate navigation apparatus shown in FIG. 1.

As shown in FIG. 2, the control unit 2 is composed of: an I/O interface 2a required for exchanging signals with an external apparatus; a CPU 2b functioning as a center of the computation processing; a ROM 2c storing therein a control operation program of this CPU 2b; and a RAM 2d in which data is temporarily written when the CPU 2b performs a control operation and from which the written data is read out. In FIG. 2, the reference numeral 3a denotes a GPS antenna.

The wheel speed detection means 1 outputs a pulse signal corresponding to the number of rotations of a tire (hereinafter also referred to as "wheel speed pulse"). The CPU 2b calculates, based on the wheel speed pulse outputted from the wheel speed detection means 1, the rotation angular velocities of the following wheel tires at every predetermined sampling cycle $\Delta T$ (sec) (e.g., $\Delta T$=0.05 seconds).

The vehicle estimate navigation apparatus according to this embodiment is composed of: the wheel speed detection means (tire rotation information detection means) 1; a speed vector calculation means for calculating, based on GPS information by a GPS receiver 3 mounted in a running vehicle, a speed vector of a running speed of the vehicle; a tire rotation information detection means for detecting rotation information of tires attached to the vehicle; a tire rotation speed calculation means for calculating, based on the tire rotation information obtained by the tire rotation information detection means, rotation speeds of the tires; a speed calculation means for calculating a vehicle speed based on the speed vector information; a yaw rate calculation means for calculating a vehicle yaw rate based on the speed vector information; a first parameter calculation means for calculating a first parameter of a first relational expression between the vehicle speed calculated by the speed calculation means and the tire rotation speed, the vehicle speed being obtained based on a formula model for calculating a tire ground speed based on the tire rotation speeds obtained by the tire rotation speed calculation means; and a second parameter calculation means for calculating a second parameter of a second relational expression between the yaw rate calculated by the yaw rate calculation means and the tire rotation speed, the yaw rate being obtained based on a formula model for calculating a tire ground speed based on the tire rotation speeds obtained by the tire rotation speed calculation means. The vehicle estimate navigation program causes the control unit 2 to function as: the speed vector calculation means, the tire rotation speed calculation means, the speed calculation means, the yaw rate calculation means, the first parameter calculation means, and the second parameter calculation means.

In the vehicle estimate navigation apparatus and the vehicle estimate navigation of the present invention, a speed vector is used as speed information by GPS.

Based on a change in the speed vector by GPS, an angular variation by an inner product (i.e., yaw rate) is calculated. A tire model parameter is estimated so that the yaw rate calculated based on the GPS information is identical with the yaw rate calculated based on a tire rotation speed as described later.

At the same time, a tire model parameter is estimated so that a vehicle speed calculated by synthesizing speed vectors in a three-dimensional direction by GPS is identical with a vehicle speed similarly calculated based on the tire rotation speed.

A driving wheel has such a tire rotation speed that is influenced not only by a load shift due to the turning but also by a slip ratio. Thus, the tire rotation speed is preferably calculated with regard to a following wheel.

In the present invention, in consideration of these tire characteristics, a tire ground speed is represented by a model using a wheel speed and an optimal model parameter is calculated in a period during which GPS can be received. When GPS cannot be received, the model parameter as described above is used to calculate a vehicle speed and a yaw rate. In this manner, an orientation change, which is the most important factor in the estimate navigation, can be accurately calculated based on the wheel speed information.

Next, the following section will describe a tire model focusing on a vehicle speed and a yaw rate. However, this method is merely an example of model preparation and the present invention is not limited to such a method.

[Method of Calculating Vehicle Speed and Yaw Rate]

The vehicle speed and the yaw rate can be calculated based on a three-dimensional speed vector by GPS. For example, as disclosed in Japanese Unexamined Patent Publication No. 2002-22816, an excursion amount can be calculated based on a satellite carrier phase.

As an excursion amount of a receiver in a three-dimensional direction, with regard to an earth fixed system of coordinates, an excursion amount De in an east-west direction, an excursion amount Dn in a north-south direction, and an excursion amount Du in a vertical direction are calculated. At the same time, instead of excursion amounts of reception points in the three-dimensional direction, with regard to speed components of reception points in the three-dimensional direction in the earth fixed system of coordinates, a component speed Ve in the east-west direction, a component speed Vn in the north-south direction, and a component speed Vu in the vertical direction are calculated.

By synthesizing these speed vectors in the three-dimensional direction, an accurate vehicle speed can be calculated based on the following formula (1).

$$V = (Ve^2 + Vn^2 + Vu^2)^{1/2} \tag{1}$$

With regard to the yaw rate (Y), by calculating, as an inner product, an angular variation at each time of the speed vector Vt obtained by subjecting the component speed Ve in the east-west direction and the component speed Vn of the north-south direction at a certain time (t) to a vector synthesis, an angular variation Hd per a calculation time can be calculated based on the following formula (2).

$$Hd = \cos^{-1}\frac{\vec{V}_t \cdot \vec{V}_{t-1}}{|V_t| \cdot |V_{t-1}|} \tag{2}$$

Then, the yaw rate (Y) can be calculated based on the Hd as an orientation change per a unit time.

[Tire Model]

Based on a relation between the speed information and the tire rotation speed by GPS during the straight running of the vehicle, the dynamic loaded radii of the four wheels can be calculated, respectively. It is assumed that the dynamic loaded radii are a reference dynamic loaded radius Dr.

A lateral G caused by the turning of the vehicle causes a change in the dynamic loaded radii of the vehicle inner and outer wheels. When the changed amount is assumed as ΔDr, the inner turning-side tire ground speed Vin and the outer turning-side tire ground speed Vout can be represented as below by the inner wheel rotation angular velocity ωin and the outer wheel rotation angular velocity ωout at the turning.

$$Vin = (Dr + \Delta Dr) \times \omega in$$

$$Vout = (Dr - \Delta Dr) \times \omega out$$

In the formula, the vehicle speed (V) can be represented by the following formula (3).

$$V = (Vin + Vout)/2 \approx (\omega in + \omega out)(Dr/2) \tag{3}$$

With regards to the yaw rate (Y), when assuming that:
the tire load sensitivity: tire deflection amount when a unit load acts thereon=b,
ratio between vehicle front and rear equivalent spring constant:load ratio of a following shaft to the entire load shift amount=K,
vehicle mass=m,
vehicle tread width=W,
vehicle height of the center of gravity=h, and
lateral acceleration=ay,
yaw rate (Y)=(Vout−Vin)/W is established.

It is also established that:

$$Vout + Vin = Dr \times (\omega out + \omega in)$$
$$Vout - Vin = Dr \times (\omega out - \omega in) - \Delta Dr \times (\omega out + \omega in)$$
$$= Dr \times (\omega out - \omega in) - 2 \times b \times K \times$$
$$(h/W) \times m \times ay \times (\omega out + \omega in)$$

$$ay = (Vout + Vin) \times (Vout - Vin)/2W.$$

Thus, the yaw rate (Y) can be represented by the following formula (4).

$$\text{Yaw rate}(Y) = \frac{Dr \cdot (\omega_{out} - \omega_{in})}{2W + b \cdot K \cdot (h/W) \cdot m \cdot Dr \cdot (\omega_{out} + \omega_{out})^2} \tag{4}$$

There can be established a model in which the vehicle speed (V) and the yaw rate (Y) is represented by vehicle and tire parameters with using the sum of and the difference in the angular velocity of the tire inner and outer wheels as a variable.

[Parameter Estimate Method]

Among the above-described tire model parameters, with regard to a parameter related to the speed (V), the formula (3) can be used to estimate parameters (A1, B1) by the least-squares method for example based on the assumption that the speed (V) obtained by GPS and the sum (x) of the rotation angular velocities of the inner and outer wheels have a relation of V=A1×x+B1.

With regard to a parameter related to the yaw rate (Y), the formula (4) can be used to estimate parameters (A2, B2, C2) by the least-squares method for example based on the assumption that the yaw rate value (Y) obtained by GPS as well as the square (z) of the sum of the inner and outer wheel angular velocities and the difference (y) of the inner and outer wheel angular velocities have a relation of Y=A2×Y/(B2×z+C2).

Embodiment 1

Figure 3:
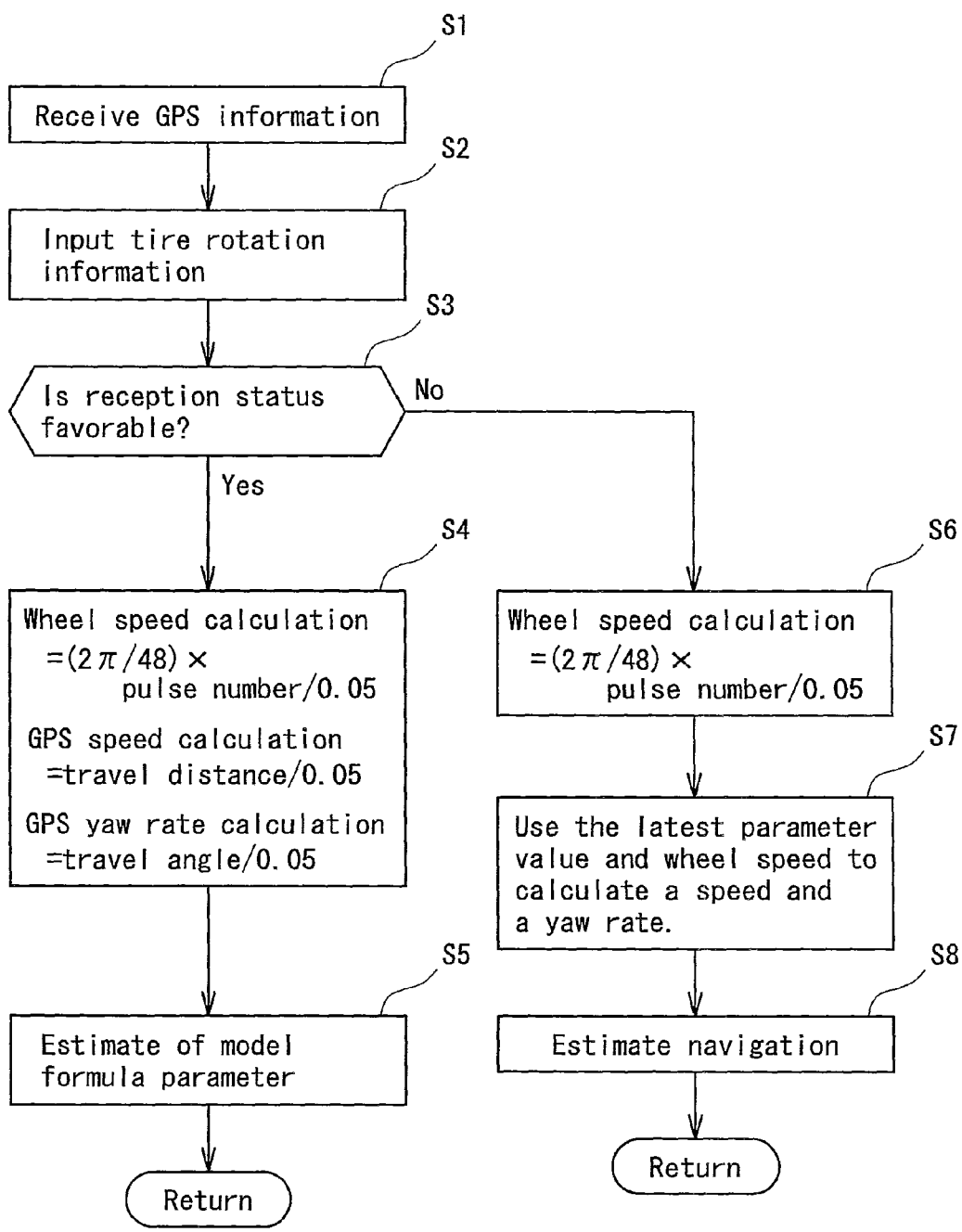
FIG. 3 is a flowchart illustrating the vehicle estimate navigation according to Embodiment 1 of the present invention.

Next, with reference to a flowchart shown in FIG. 3, the following section will describe Embodiment 1 of the vehicle estimate navigation of the present invention. In Embodiment 1, whenever a predetermined time is reached during GPS reception (specifically at every 50 ms), the parameters are estimated. When the GPS reception is impossible, the speed and the yaw rate of the vehicle are calculated based on the estimated latest parameters and the wheel speed data.

First, in Step S1, GPS information is received from the GPS apparatus 3. This GPS information includes an absolute vehicle position.

Next, in Step S2, a pulse signal corresponding to the number of tire rotations is inputted from the wheel speed detection means 1. The wheel speed detection means 1 in Embodiment 1 generates 48 pulses per one tire rotation.

Next, in Step S3, whether the signal from the GPS receiver 3 is sufficiently received or not is determined. Specifically, this determination is carried out based on a DOP value outputted from the GPS (deterioration factor of positioning accuracy). When the DOP value is equal to or lower than a predetermined value, the reception status is determined to be unfavorable.

When it is determined in Step S3 that the status of the signal reception from the GPS receiver 3 is favorable, then the wheel speed (tire rotation angular velocity), the vehicle speed based on the GPS information, and the yaw rate based on the GPS information are calculated in Step S4 at a predetermined sampling cycle ΔT of 0.05 seconds. The wheel speed, the vehicle speed, and the yaw rate are calculated based on the following formulae, respectively.

Wheel speed=(2π/48)×pulse number/0.05

Vehicle speed=travel distance/0.05

Yaw rate=travel angle/0.05

In the formulae, the travel distance and the travel angle can be calculated based on a change amount of the absolute vehicle position during a period of 0.05 seconds. The wheel speed is calculated with regard to the left wheel and the right wheel of the following shaft, respectively.

Next, in Step S5, the parameters of the model formula (A1, B1, A2, B2, and C2) are estimated based on the sequential least-squares method. Then, the estimated parameters are stored in a storage means of the control unit 2. This parameter estimate is always carried out during the reception of the GPS information. The last estimated parameter is sequentially updated to a newly-estimated latest parameter.

On the other hand, when it is determined in Step S3 that the reception of the GPS information is unfavorable or is impossible, the wheel speed is calculated in Step S6 as in Step S4.

Next, in Step S7, the wheel speed calculated in Step S6 and the latest parameter stored in the storage means of the control unit 2 are used to calculate the vehicle speed and the yaw rate at every predetermined sampling cycle ΔT of 0.05 seconds.

Then, based on the vehicle speed and yaw rate calculated in Step S7, the vehicle estimate navigation is carried out in Step S8.

Embodiment 2

Figure 4:
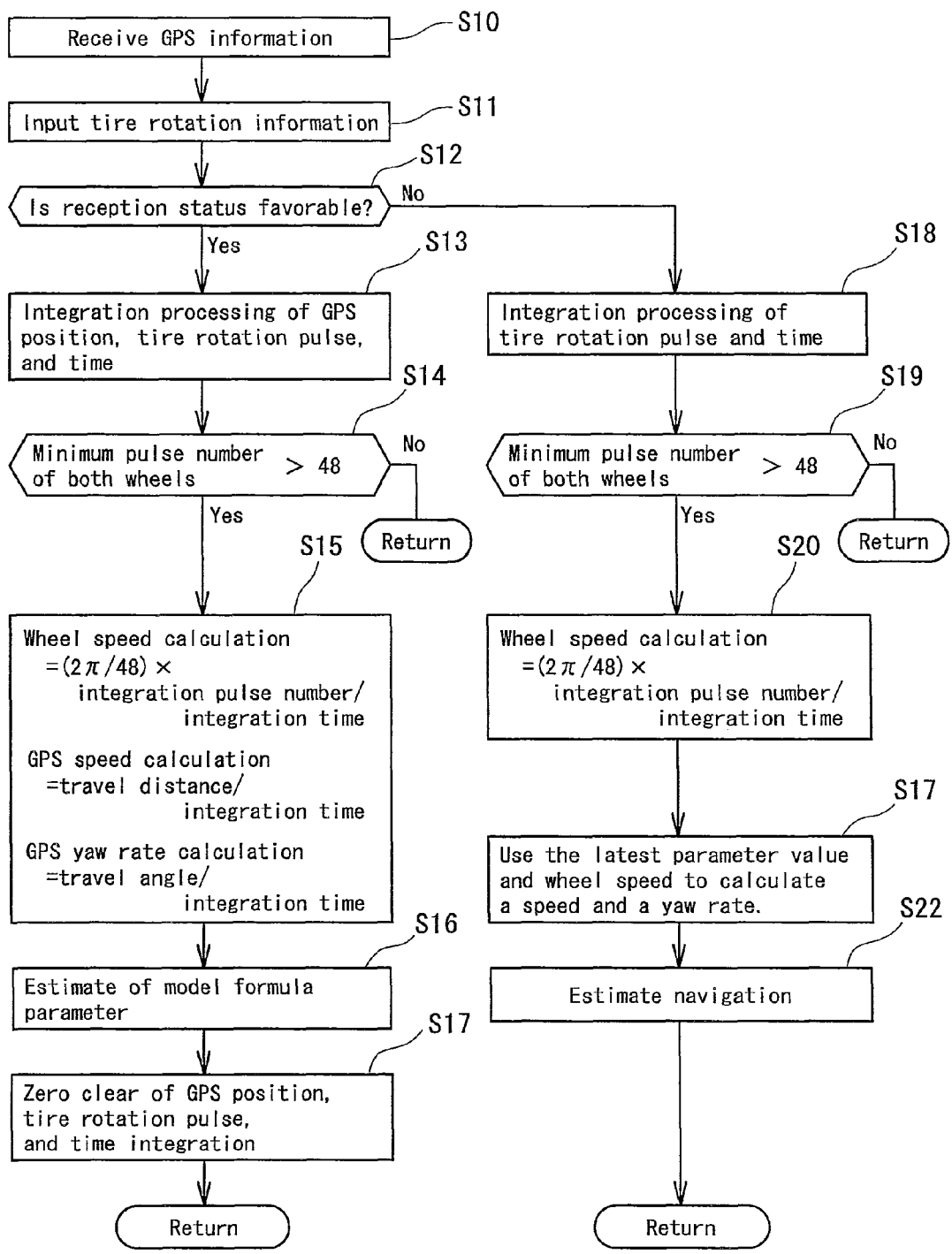
FIG. 4 is a flowchart illustrating the vehicle estimate navigation according to Embodiment 2 of the present invention.

Next, with reference to a flowchart shown in FIG. 4, the following section will describe Embodiment 2 of the vehicle estimate navigation of the present invention. In Embodiment 2, at every predetermined pulse number during the GPS reception (specifically, at every 48 pulses), the parameters are estimated. When the GPS reception is impossible, based on the estimated latest parameters, the speed and the yaw rate of the vehicle are calculated. In Embodiment 2, the wheel speed detection means 1 that generates 48 pulses at every one tire rotation is used. The parameters are estimated at every one tire rotation.

The tire rotation speed is generally calculated by a pulse signal from a pulse generating-type sensor used for ABS. This pulse signal is a fixed value such as 48 pulses per one tire rotation for example. Thus, the lower the vehicle speed is, the smaller the pulse number inputted per a unit time is, thus deteriorating the estimate accuracy in a low-speed region. In an extreme case, there may be a case where only 0 to 1 pulse exists in a period of 50 msec. Even when a unit time (sampling time) is extended, the accuracy in the low-speed region does not reach the accuracy in a high-speed region. An excessively-extended unit time on the other hand prevents the estimate from following a rapid angular variation or speed change of the vehicle.

To solve this, in Embodiment 2, instead of the estimate at every predetermined time (Embodiment 1), the estimate of parameters at every predetermined pulse number is carried out.

First, in Step S10, the GPS information from the GPS apparatus 3 is received. This GPS information includes an absolute vehicle position.

Next, in Step S11, a pulse signal corresponding to the number of tire rotations is inputted from the wheel speed detection means 1. The wheel speed detection means 1 in Embodiment 2 also generates 48 pulses per one tire rotation as in Embodiment 1.

Next, in Step S12, whether the signal from the GPS receiver 3 is sufficiently received or not is determined. When it is determined in Step S12 that the status of the signal reception from the GPS receiver 3 is favorable, then the GPS position information, the tire rotation pulse, and time are subjected in Step S13 to an integration processing.

Next, in Step S14, whether the pulse number integrated for the both wheels (left and right wheels of the following wheels) exceeds 48 pulses corresponding to one rotation for one tire rotation or not is determined.

When it is determined in Step S14 that the pulse number integrated for the both wheels exceeds 48 pulses, in Step S15, the wheel speed (tire rotation angular velocity), the vehicle speed based on the GPS information, and the yaw rate based on the GPS information are calculated. The wheel speed, vehicle speed, and yaw rate are calculated based on the following formulae, respectively.

Wheel speed=(2π/48)×integrated pulse number/integrated time

Vehicle speed=travel distance/integrated time

Yaw rate=travel angle/integrated time

Next, in Step S16, the parameters (A1, B1, A2, B2, and C2) of the model formula are estimated based on the sequential least-squares method. Then, the estimated parameters are stored in the storage means of the control unit 2. This parameter estimate is always carried out during the reception of the GPS information. The last estimated parameter is sequentially updated to a newly-estimated latest parameter.

Next, in Step S17, the integration value of the GPS position, the tire rotation pulse and time is set to zero.

On the other hand, when it is determined in Step S12 that the reception of the GPS information is unfavorable or is impossible, the tire rotation pulse and time are subjected in Step S18 to an integration processing.

Next, in Step S19, whether the pulse number integrated with regard to both wheels (left and right wheels of the following wheels) exceeds 48 pulses corresponding to one tire rotation or not is determined.

When it is determined in Step S19 that the pulse number integrated with regard to both wheels exceeds 48 pulses, in Step S20, the wheel speed (tire rotation angular velocity) is calculated as in Step S15.

Next, in Step S21, the wheel speed calculated in Step S20 and the latest parameter stored in the storage means of the control unit 2 are used to calculate the vehicle speed and the yaw rate.

Then, based on the vehicle speed and yaw rate calculated in Step S21, the vehicle estimate navigation is carried out in Step S22.

Next, the following section will describe an example of the vehicle estimate navigation of the present invention. However, the present invention is not limited to the example only.

EXAMPLE 1, COMPARATIVE EXAMPLE 1, and REFERENCE EXAMPLE

A 1500 cc-FF vehicle was attached with tires made by Sumitomo Rubber Industries, Ltd. (195/60R15 SP10). This vehicle was used to carry out a steady-circle turning at a speed of 60 km per hour in an experiment road in the Okayama test course of Sumitomo Rubber Industries, Ltd. The turning radius was 50 m. The vehicle was attached with VBOX (which is a product name of a GPS speedometer made by Race Logic of Britain).

First, under the circumstance where GPS can be received, the vehicle was caused to run around the experiment road (50 R) three times and parameters were estimated by the above-described method.

Thereafter, a GPS antenna was disconnected and the vehicle was caused to run around the same experiment road. Then, the resultant wheel speed data was used to calculate a turning radius based on the parameter value calculated at the GPS reception (Example 1). Based on the assumption that the inner and outer wheels have an identical dynamic loaded radius and based on the resultant wheel speed data, the turning radius was geometrically calculated (Comparative Example 1). A reference turning radius was calculated based on the GPS information at the GPS reception (Reference Example), the results thereof are shown in FIG. 5.

Figure 5:
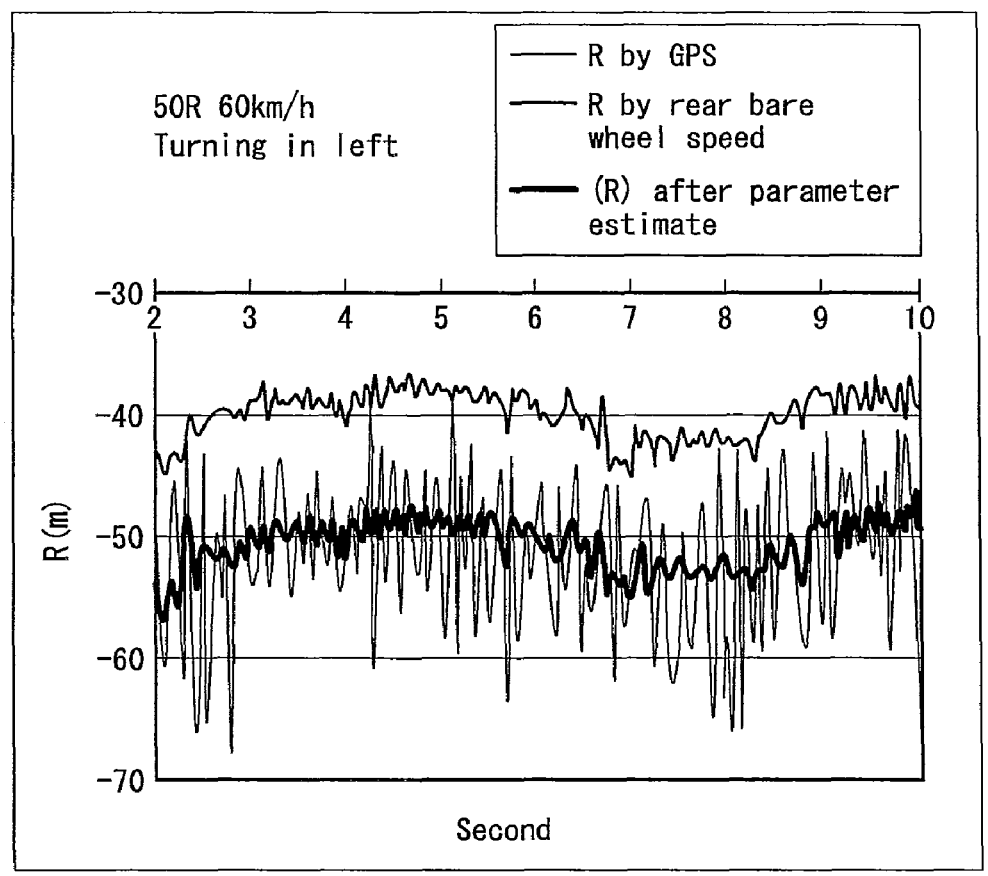
FIG. 5 illustrates the calculation result of a turning radius.

As can be seen from FIG. 5, in Comparative Example 1 where no model formula is used and the turning radius is geometrically calculated based on the wheel speed data, the turning radius is about 40 R. In Example 1 using the model formula, the turning radius is about 50 R which is close to that of the experiment running. This 50 R is close to the calculation result based on GPS information (Reference Example), showing that the calculation in the present invention by a parameter estimate model is highly accurate.

EXAMPLE 2 and EXAMPLE 3

The estimate accuracy was compared between a case where the parameter estimate was performed at every one tire rotation (Example 2) and a case where the parameter estimate was performed at every predetermined time (50 msec) (Example 3).

Figure 6:
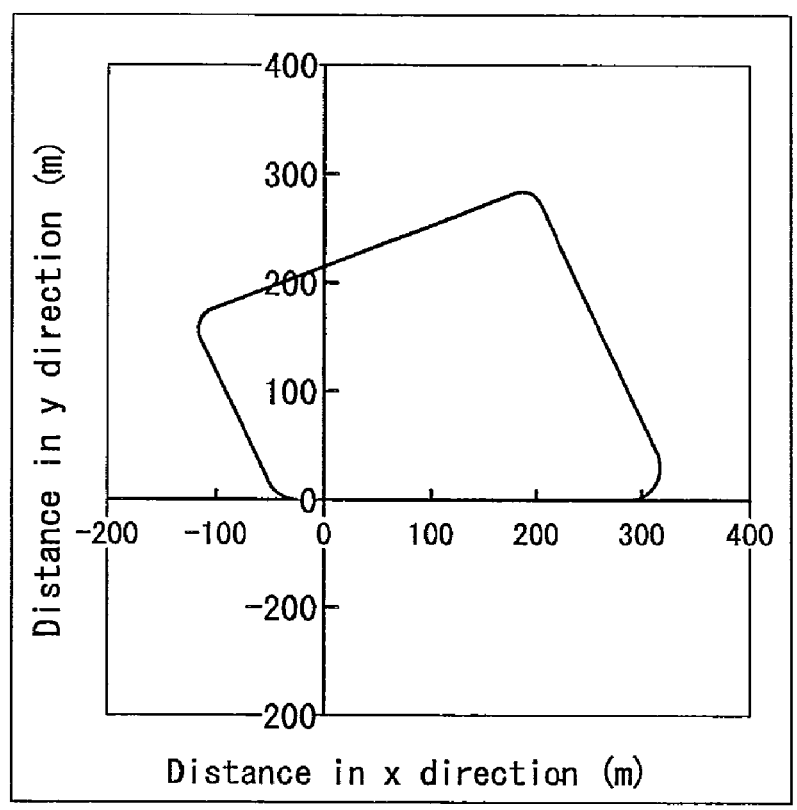
FIG. 6 illustrates a running route.
Figure 7:
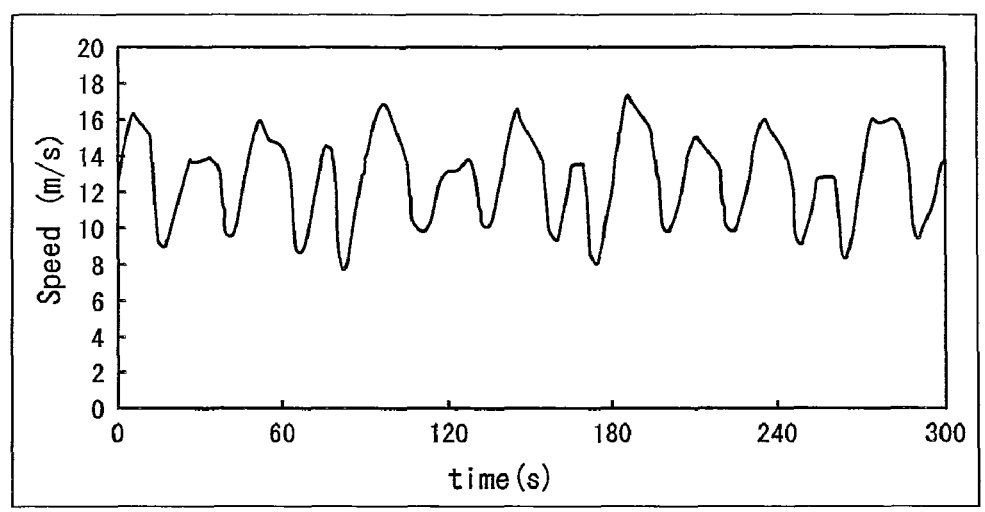
FIG. 7 illustrates a change of a vehicle speed during a normal running.

A 1500 cc-FF vehicle was attached with tires made by Sumitomo Rubber Industries, Ltd. (195/60R15 SP10). This vehicle was caused, under the circumstance where GPS can be received, to run along the course shown in FIG. 6 at a normal speed (50 to 60 km/h in a straight course and 30 to 40 km/h at a corner) three times and parameters were estimated. The vehicle was attached with VBOX (which is a product name of a GPS speedometer made by Race Logic of Britain). FIG. 7 illustrates a change in the vehicle speed during a normal driving.

After the parameter estimate, while the parameter estimate was being forcedly stopped on the program, the vehicle was caused to run along the same course. Then, the wheel speed data and the estimated parameter value were used to calculate the vehicle speed and the yaw rate. Then, a yaw angle (orientation angle) calculated based on the speed and yaw rate was compared with a GPS yaw angle and a difference therebetween was compared.

Figure 8:
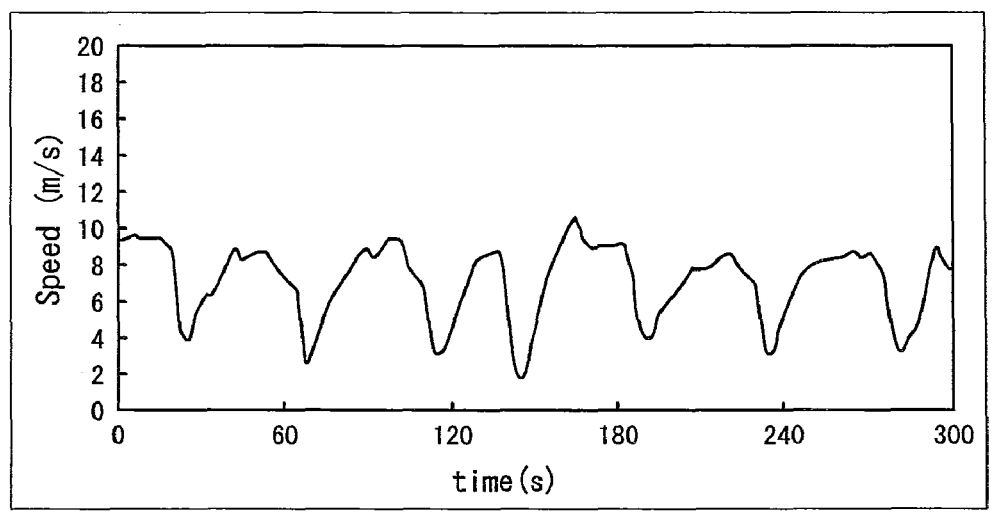
FIG. 8 illustrates a change in a vehicle speed during a low-speed running.

Next, at a low speed (30 to 35 km/h in a straight course and at 10 to 15 km/h at a corner), the parameter estimate and the comparison of the difference in the yaw angle were carried out. FIG. 8 illustrates a change in the vehicle speed during the low-speed running.

Normal Running

Figure 9:
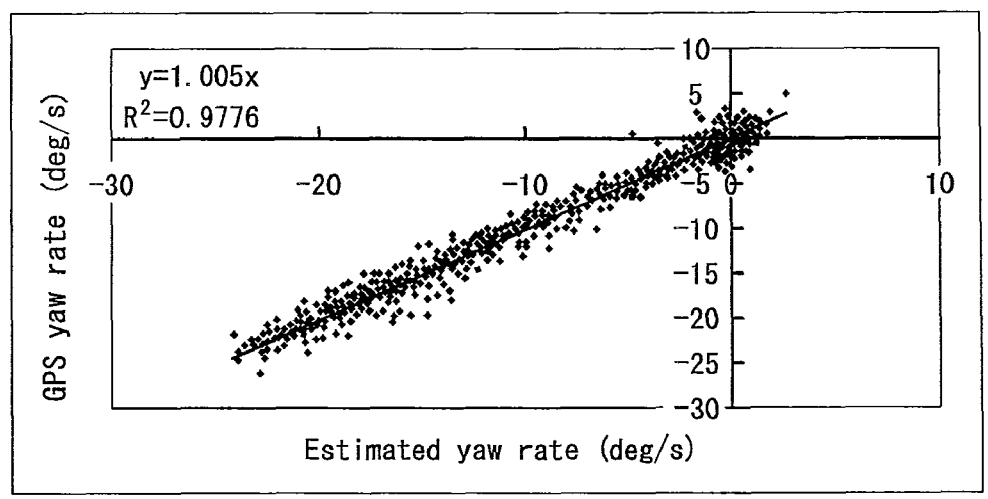
FIG. 9 illustrates the relation between the yaw rate estimated in Example 2 and an actual yaw rate during a normal running.
Figure 10:
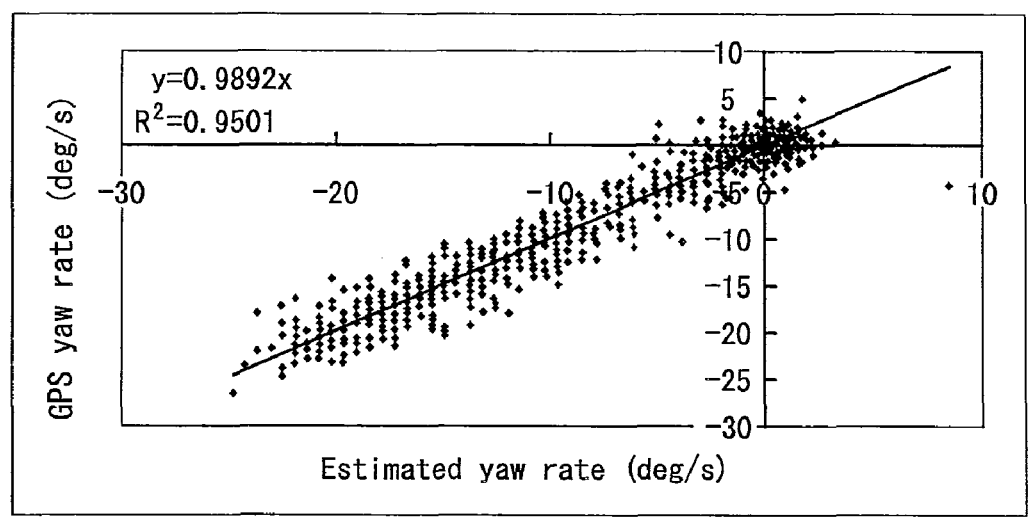
FIG. 10 illustrates the relation between the yaw rate estimated in Example 3 and an actual yaw rate during a normal running.

FIG. 9 shows the relation between an actual yaw rate value (GPS value) and the yaw rate value estimated based on the wheel speed at every one tire rotation (Example 2). FIG. 10 shows the relation between the actual yaw rate value (GPS value) and the yaw rate value estimated based on the wheel speed at every 50 ms (Example 3). Although FIG. 9 and FIG. 10 both show a high correlation, Example 3 shows a contribution ratio of 0.9501 and Example 2 shows a slightly-improved contribution ratio of 0.9776.

Figure 11:
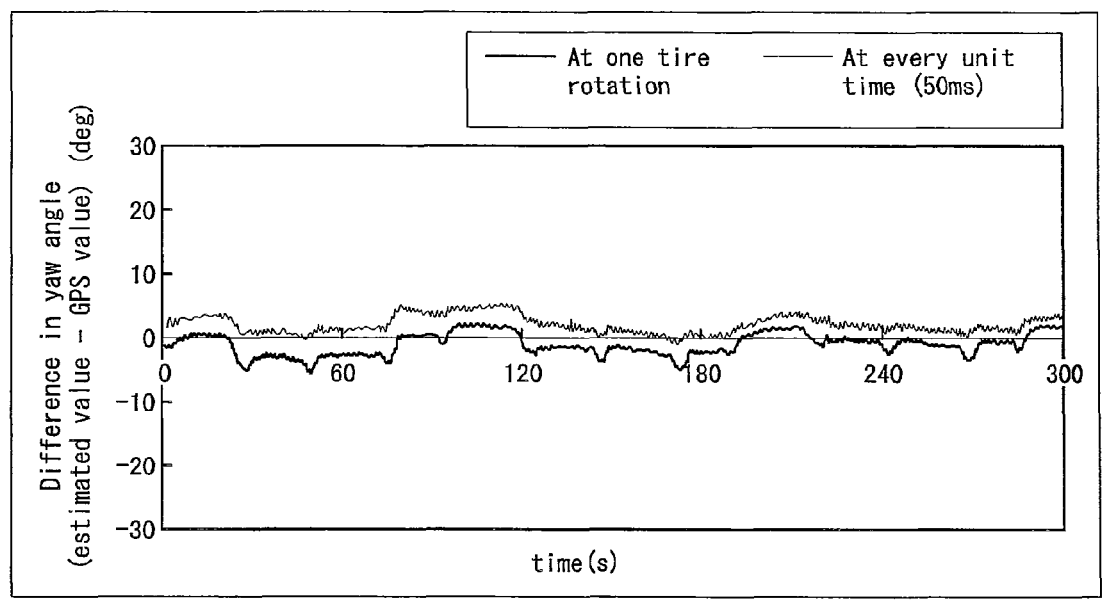
FIG. 11 illustrates the temporal change in the difference between the estimated yaw rate and the actual yaw rate.

By subjecting the estimated yaw rate to time integration, an estimated yaw angle (orientation angle) is calculated. Then, a difference between the estimated yaw angle and the actual yaw angle (GPS value) was calculated to investigate the difference between the estimated value and the actual value as time passed, the result of which is shown in FIG. 11. The difference of the yaw angle from the actual angle after 300 s was slightly smaller in Example 2 than in Example 3. However, no clear difference was observed.

Low-Speed Running

Figure 12:
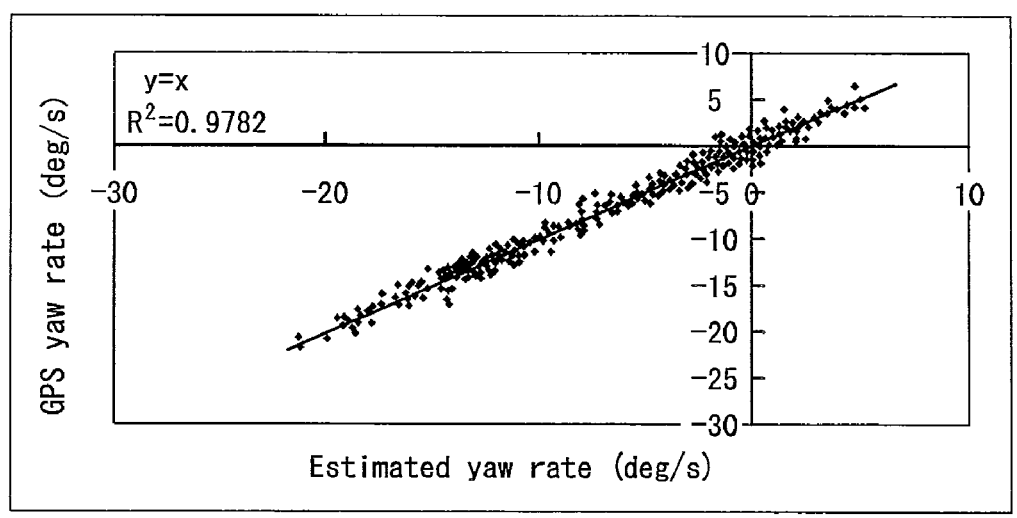
FIG. 12 illustrates the relation between the yaw rate estimated in Example 2 and the actual yaw rate during the low-speed running.
Figure 13:
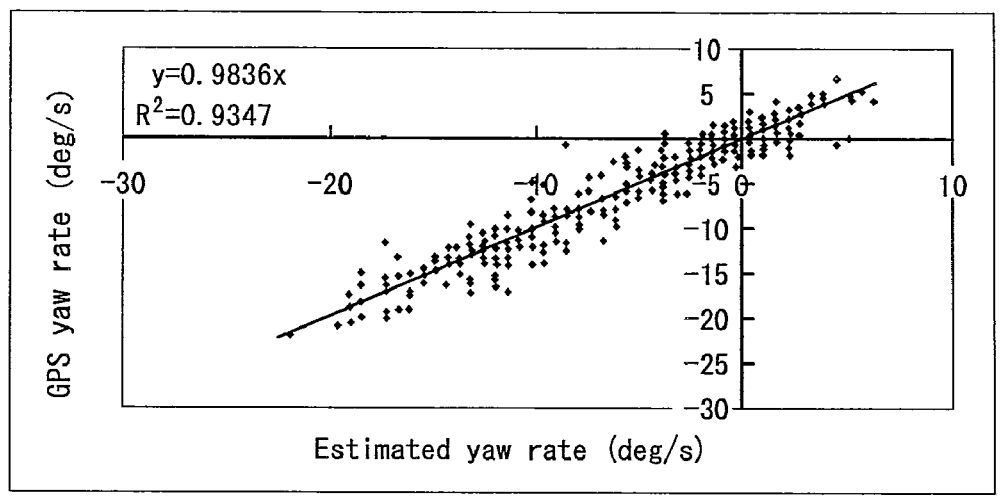
FIG. 13 illustrates the relation between the yaw rate estimated in Example 3 and the actual yaw rate during the low-speed running.

FIG. 12 illustrates the relation between the actual yaw rate value (GPS value) and the yaw rate value estimated based on the wheel speed at every one tire rotation (Example 2). FIG. 13 shows the relation between the actual yaw rate value (GPS value) and the yaw rate value estimated based on the wheel speed at every 50 ms (Example 3). Example 3 shows a contribution ratio of 0.9347 which is lower than 0.9501 during the normal running. On the other hand, Example 2 shows a contribution ratio of 0.9786, which shows no difference between the normal running and the low-speed running.

Figure 14:
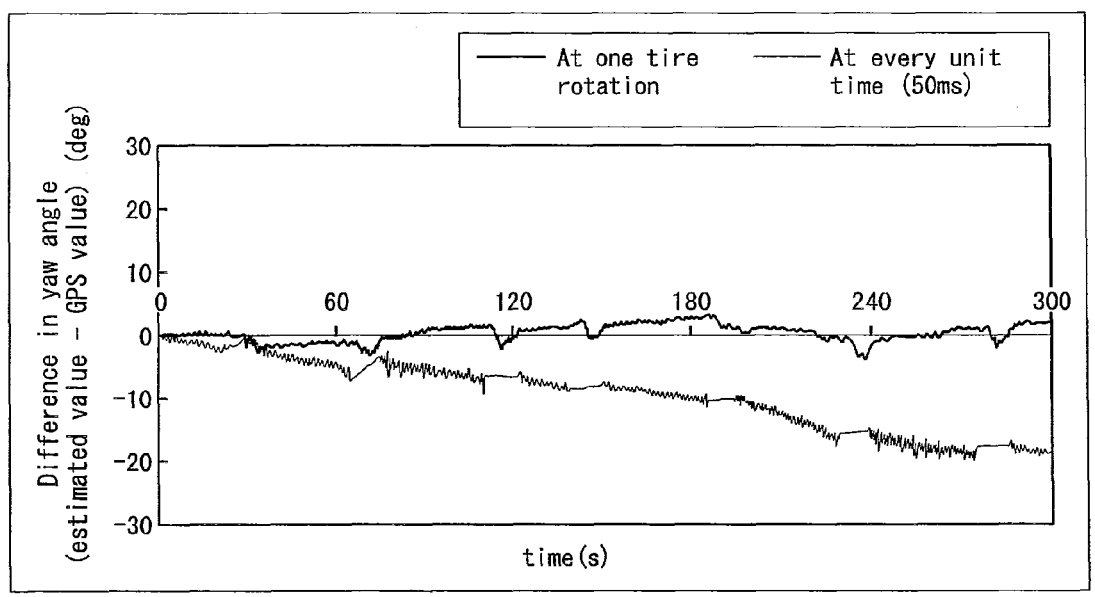
FIG. 14 illustrates the temporal change in the difference between the estimated yaw rate and the actual yaw rate.

As in the normal running, the estimated yaw rate was subjected to time integration to thereby calculate an estimated yaw angle (orientation angle). Then, a difference between the estimated yaw angle and the actual yaw angle (GPS value) was calculated to investigate the difference between the estimated value and the actual value as time passed, the result of which is shown in FIG. 14.

Example 3 shows a low parameter estimate accuracy as is clear from the low contribution ratio. Thus, the difference in the yaw angle from the actual value after 300 ms increases as time passes. On the other hand, Example 2 shows the difference in the yaw angle from the actual value at the same level as in the normal running. This demonstrates that, under the low-speed conditions, Example 2 in which the parameter estimate is performed at every one tire rotation is clearly more significant than Example 3 in which the parameter estimate is performed at every 50 ms.

The invention claimed is:

1. A vehicle estimate navigation apparatus comprising:
    a speed vector calculation means for calculating, based on GPS information by a GPS receiver mounted in a running vehicle, a speed vector of a running speed of the vehicle;
    a tire rotation information detection means for detecting rotation information of tires attached to the vehicle;
    a tire rotation speed calculation means for calculating rotation speeds of the tires based on tire rotation information obtained by the tire rotation information detection means;

a speed calculation means for calculating a vehicle speed based on the speed vector information;

a yaw rate calculation means for calculating a vehicle yaw rate based on the speed vector information;

a first parameter calculation means for calculating a first parameter of a first relational expression between the vehicle speed calculated by the speed calculation means and the tire rotation speed, the vehicle speed being obtained based on a formula model for calculating a tire ground speed based on the tire rotation speeds obtained by the tire rotation speed calculation means; and a second parameter calculation means for calculating a second parameter of a second relational expression between the yaw rate calculated by the yaw rate calculation means and the tire rotation rate, the yaw rate being obtained based on a formula model for calculating a tire ground speed based on the tire rotation speeds obtained by the tire rotation speed calculation means.

2. The vehicle estimate navigation apparatus of claim 1, wherein the first parameter calculation means and the second parameter calculation means are respectively configured so as to always calculate the first parameter and the second parameter when GPS information is received and to use, when the GPS information cannot be received, the latest calculated parameter to calculate the vehicle speed and the yaw rate based on the tire rotation speed.

3. The vehicle estimate navigation apparatus of claim 2, wherein the calculation of the first parameter and the second parameter when the GPS information is received is configured to be carried out whenever every predetermined time is reached.

4. The vehicle estimate navigation apparatus of claim 2, wherein the calculation of the first parameter and the second parameter when the GPS information is received is configured to be carried out whenever the pulse number from the tire rotation information detection means reaches a predetermined value.

5. The vehicle estimate navigation apparatus of claim 2, wherein the calculation of the first parameter and the second parameter when the GPS information is received is configured to be carried out for each one rotation of the tires.

6. The vehicle estimate navigation apparatus of claim 5, wherein the calculation of the vehicle speed and the yaw rate using the latest parameter based on the tire rotation speed, when the reception of GPS information is impossible, is performed for each one rotation of the tires.

7. The vehicle estimate navigation apparatus of claim 1, wherein when assuming that the vehicle speed obtained by the speed calculation means is V and the sum of the rotation angular velocities of the inner and outer wheels is x, the first relational expression is $V = A1 \times x + B1$ in which $A1$ and $B1$ are the first parameters; and when assuming that the yaw rate obtained by the yaw rate calculation means is Y, the square of the sum of the rotation angular velocities of the inner and outer wheels is z, and a difference between the rotation angular velocities of the inner and outer wheels is y, the second relational expression is $Y = A2 \times y / (B2 \times z + C2)$ in which $A2$, $B2$, and $C2$ are the second parameters.

8. The vehicle estimate navigation apparatus of claim 1, wherein the rotation speed is a rotation speed of a following wheel tire.

9. A vehicle estimate navigation comprising:

a speed vector calculation step of calculating, based on GPS information by a GPS receiver mounted in a running vehicle, a speed vector of a running speed of the vehicle;

a tire rotation speed calculation step of calculating rotation speeds of the tires based on tire rotation information obtained by the tire rotation information detection means for detecting rotation information of tires attached to the vehicle;

a speed calculation step of calculating a vehicle speed based on the speed vector information;

a yaw rate calculation step of calculating a vehicle yaw rate based on the speed vector information;

a first parameter calculation step of calculating a first parameter of a first relational expression between the vehicle speed calculated in the speed calculation step and the tire rotation speed, the vehicle speed being obtained based on a formula model for calculating a tire ground speed based on the tire rotation rates obtained in the tire rotation speed calculation step; and a second parameter calculation step of calculating a second parameter of a second relational expression between the yaw rate calculated in the yaw rate calculation step and the tire rotation speed, the yaw rate being obtained based on a formula model for calculating a tire ground speed based on the tire rotation speeds obtained in the tire rotation speed calculation step.

10. The vehicle estimate navigation of claim 9, wherein the first parameter calculation step and the second parameter calculation step are respectively configured so as to always calculate the first parameter and the second parameter when GPS information is received and to use, when the GPS information cannot be received, the latest calculated parameter to calculate the vehicle speed and the yaw rate based on the tire rotation speed.

11. The vehicle estimate navigation of claim 10, wherein the calculation of the first parameter and the second parameter when the GPS information is received is configured to be carried out whenever every predetermined time is reached.

12. The vehicle estimate navigation of claim 10, wherein the calculation of the first parameter and the second parameter when the GPS information is received is configured to be carried out whenever the pulse number from the tire rotation information detection means reaches a predetermined value.

13. The vehicle estimate navigation of claim 10, wherein the calculation of the first parameter and the second parameter when the GPS information is received is configured to be carried out for each one rotation of the tires.

14. The vehicle estimate navigation of claim 13, wherein the calculation of the vehicle speed and the yaw rate using the latest parameter based on the tire rotation speed, when the reception of GPS information is impossible, is performed for each one rotation of the tires.

15. The vehicle estimate navigation of claim 9, wherein when assuming that the vehicle speed obtained in the speed calculation step is V and the sum of the rotation angular velocities of the inner and outer wheels is x, the first relational expression is $V = A1 \times x + B1$ in which $A1$ and $B1$ are the first parameters; and when assuming that the yaw rate obtained in the yaw rate calculation step is Y, the square of the sum of the rotation angular velocities of the inner and outer wheels is z, and a difference between the rotation angular velocities of the inner and outer wheels is y, the second relational expression can be $Y = A2 \times y / (B2 \times z + C2)$ in which $A2$, $B2$, and $C2$ are the second parameters.

16. The vehicle estimate navigation apparatus of claim 9, wherein the rotation speed is a rotation speed of a following wheel tire.

17. A vehicle estimate navigation program causing, in order to carry out an estimate navigation, a computer to function as:

- a speed vector calculation means for calculating, based on GPS information by a GPS receiver mounted in a running vehicle, a speed vector of a running speed of the vehicle,
- a tire rotation speed calculation means for calculating rotation speeds of tires based on tire rotation information obtained by the tire rotation information detection means for detecting rotation information of the tires attached to the vehicle;
- a speed calculation means for calculating a vehicle speed based on the speed vector information;
- a yaw rate calculation means for calculating a vehicle yaw rate based on the speed vector information;
- a first parameter calculation means for calculating a first parameter of a first relational expression between the vehicle speed calculated by the speed calculation means and the tire rotation speed, the vehicle speed being obtained based on a formula model for calculating a tire ground speed based on the tire rotation speeds obtained by the tire rotation speed calculation means; and
- a second parameter calculation means for calculating a second parameter of a second relational expression between the yaw rate calculated by the yaw rate calculation means and the tire rotation rate, the yaw rate being obtained based on a formula model for calculating a tire ground speed based on the tire rotation rates obtained by the tire rotation speed calculation means.

* * * * *